(No Model.)
J. W. CALEF.
COMBINED RAKE AND HOE.
No. 322,254. Patented July 14, 1885.
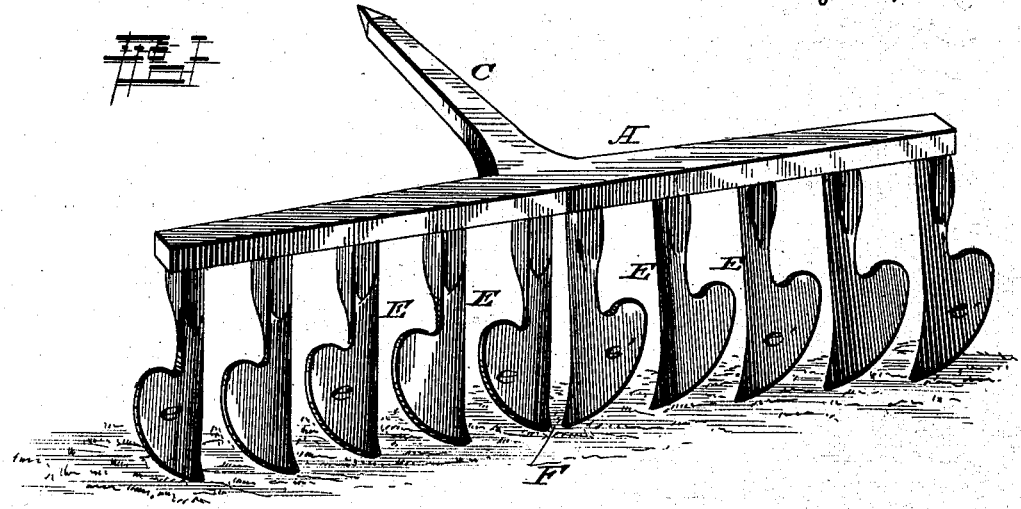
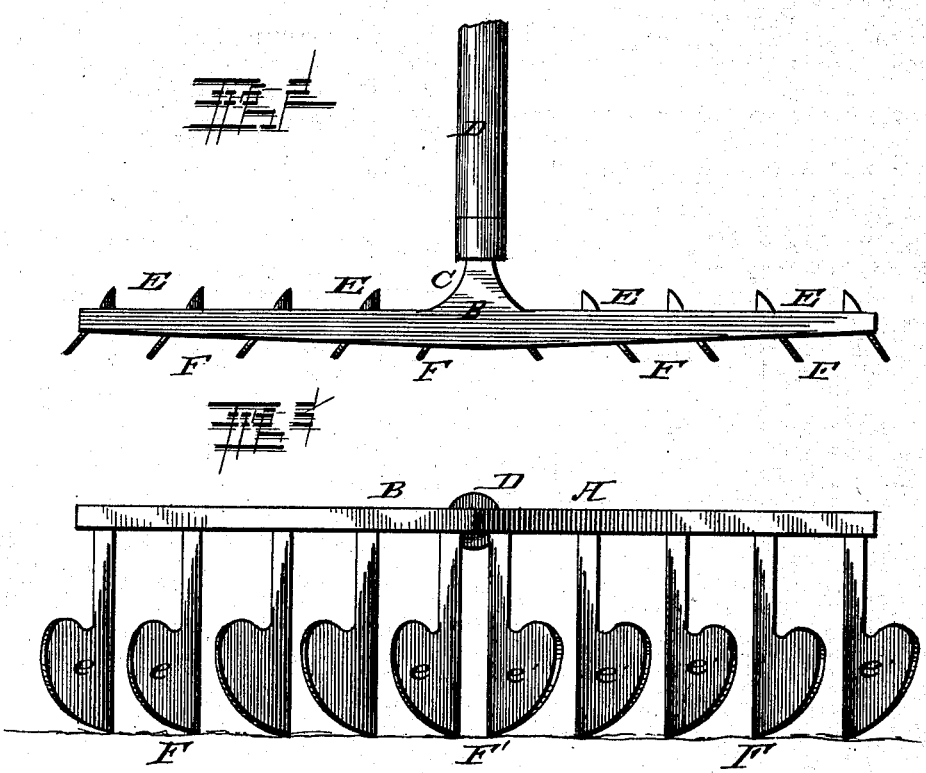
WITNESSES:
Fred. G. Dieterich.
Wm. Bagger.
INVENTOR.
Joseph Warren Calef,
by Louis Bagger & Co.
ATTORNEYS.
N. PETERS, Photo-Lithographer, Washington, D. C.

United States Patent Office

JOSEPH WARREN CALEF, OF NORTH EASTON, MASSACHUSETTS.

COMBINED RAKE AND HOE.

SPECIFICATION forming part of Letters Patent No. 322,254, dated July 14, 1885.

Application filed August 29, 1884. (No model.)

*To all whom it may concern:*

Be it known that I, JOSEPH W. CALEF, a citizen of the United States, and a resident of North Easton, in the county of Bristol and State of Massachusetts, have invented certain new and useful Improvements in Combined Rakes and Hoes; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved combined rake and hoe. Fig. 2 is a plan view, and Fig. 3 is a front view, of the same.

The same letters refer to the same parts in all the figures.

This invention relates to an improved agricultural implement in which shall be comprised a rake and a hoe or devices which may be successfully used for the purposes for which these devices are ordinarily employed.

To these ends the invention consists in the improved construction and arrangement of parts, which will be hereinafter fully described, and particularly pointed out in the claims.

In the drawings hereto annexed, A designates the head of my improved rake, which comprises a cross-bar, B, having a pointed shank, C, by means of which it may be readily secured in the handle of the rake, which in the drawings hereto annexed is denoted by letter D.

E E designate the rake-teeth, which may be formed in one piece with the cross-bar B, or secured detachably to the latter. Of these teeth two sets are used, designated, respectively, by letters $e$ and $e'$, and provided at their lower ends with blades F F', shaped like the mold-boards of right and left hand plows, and extending outwardly in opposite directions from the center of the cross-bar B, which carries the said rake-teeth.

From the foregoing description, taken in connection with the drawings hereto annexed, the operation and advantages of my invention will be readily understood.

The device, when used after the manner of an ordinary rake, is easily handled and very efficient, inasmuch as it tends to stir and turn the soil. It is also useful as a hoe for turning the soil, and when pushed in a forward direction for turning or scraping the soil around the roots of growing plants.

I am aware that hoes and rakes have been made serrated at their lower edges, the said serrations having their inner edges inclined outward, and I do not wish to claim such construction, broadly; but

I claim—

1. As an improvement in combined rakes and hoes, the combination, with a cross-bar having a pointed shank for attachment to the handle, of a series of downwardly-extending teeth having blades at their lower ends extending outwardly in opposite directions from the center, substantially as and for the purpose set forth.

2. An improved combined rake and hoe comprising a cross-bar having a pointed shank and provided with a series of downwardly-extending teeth, the lower ends of which are equipped with blades extending outwardly from the center of the cross-bar, substantially as and for the purpose set forth.

In testimony that I claim the foregoing as my own I have hereunto affixed my signature in presence of two witnesses.

JOSEPH WARREN CALEF.

Witnesses:
LEBBEUS H. BROCKWAY,
TYLER B. KING.